United States Patent
Kim et al.

(10) Patent No.: US 11,631,304 B2
(45) Date of Patent: Apr. 18, 2023

(54) APPARATUS FOR GENERATING VIRTUAL EFFECT FOR ELECTRIC VEHICLE

(71) Applicants: Hyundai Motor Company, Seoul (KR); Kia Corporation, Seoul (KR)

(72) Inventors: Ki Chang Kim, Gyeonggi-do (KR); Dong Chul Park, Gyeonggi-Do (KR); Tae Kun Yun, Gyeonggi-do (KR); Sang Jin Hong, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 31 days.

(21) Appl. No.: 17/380,847

(22) Filed: Jul. 20, 2021

(65) Prior Publication Data

US 2022/0198890 A1    Jun. 23, 2022

(30) Foreign Application Priority Data

Dec. 21, 2020  (KR) ................. 10-2020-0179388

(51) Int. Cl.
    *G08B 6/00*      (2006.01)
    *B60N 2/24*      (2006.01)
    *H02K 33/18*     (2006.01)
    *G08B 3/10*      (2006.01)
    *B60N 2/90*      (2018.01)

(52) U.S. Cl.
    CPC ............... *G08B 6/00* (2013.01); *B60N 2/24* (2013.01); *B60N 2/976* (2018.02); *G08B 3/10* (2013.01); *H02K 33/18* (2013.01)

(58) Field of Classification Search
    CPC . G08B 6/00; G08B 3/10; B60N 2/976; B60N 2/24; H02K 33/18

USPC .......................................................... 340/438
See application file for complete search history.

(56) References Cited

U.S. PATENT DOCUMENTS

| 5,111,697 A | * | 5/1992 | Habermann | H02K 33/00 73/668 |
| 5,396,563 A | * | 3/1995 | Yoshimi | H04R 1/1016 381/372 |
| 5,618,995 A | * | 4/1997 | Otto | G09B 9/052 434/62 |

(Continued)

FOREIGN PATENT DOCUMENTS

| KR | 101926990 B1 | 12/2018 |
| KR | 101947317 B1 | 2/2019 |
| KR | 2019-0051451 A | 5/2019 |

*Primary Examiner* — Zhen Y Wu
(74) *Attorney, Agent, or Firm* — Fox Rothschild LLP (57) ABSTRACT

An apparatus for generating a virtual effect of an electric vehicle includes: a driving information detector configured to detect vehicle driving information in the electric vehicle; a controller configured to determine a characteristic of the virtual effect based on the vehicle driving information detected by the driving information detector, and configured to generate a virtual effect producing signal for producing the determined characteristic of the virtual effect; and a vibration actuator provided in a seat of the electric vehicle such that when the vibration actuator operates, a driver or a passenger who is in the seat experiences vibration, the vibration actuator being controlled by the virtual effect producing signal generated by the controller, so as to produce the vibration according to the determined characteristic of the virtual effect.

11 Claims, 8 Drawing Sheets

(56) References Cited

U.S. PATENT DOCUMENTS

| | | | | |
|---|---|---|---|---|
| 5,646,465 A | * | 7/1997 | Paweletz | D01H 4/14 |
| | | | | 57/58.3 |
| 5,669,818 A | * | 9/1997 | Thorner | G09B 9/05 |
| | | | | 463/47 |
| 2005/0276434 A1 | * | 12/2005 | Kobayashi | H04R 9/06 |
| | | | | 381/396 |
| 2006/0244400 A1 | * | 11/2006 | Miura | H02K 33/18 |
| | | | | 318/128 |
| 2006/0266967 A1 | * | 11/2006 | Miura | B06B 1/045 |
| | | | | 251/129.15 |
| 2008/0060861 A1 | * | 3/2008 | Baur | B60K 1/00 |
| | | | | 180/65.6 |
| 2008/0285769 A1 | * | 11/2008 | Toyama | B60R 11/0223 |
| | | | | 381/86 |
| 2008/0298944 A1 | * | 12/2008 | Hofmeister | B25J 18/00 |
| | | | | 414/744.5 |
| 2009/0096299 A1 | * | 4/2009 | Ota | B06B 1/045 |
| | | | | 310/25 |
| 2009/0267423 A1 | * | 10/2009 | Kajiwara | H02K 33/02 |
| | | | | 310/38 |
| 2010/0046783 A1 | * | 2/2010 | Huang | H04R 1/1075 |
| | | | | 381/380 |
| 2015/0172821 A1 | * | 6/2015 | Lee | H04R 9/046 |
| | | | | 381/410 |
| 2018/0092231 A1 | * | 3/2018 | Choi | H04B 1/3818 |
| 2019/0016347 A1 | * | 1/2019 | Mergl | B60W 50/16 |
| 2019/0092231 A1 | * | 3/2019 | Lee | G10K 9/20 |
| 2019/0106020 A1 | * | 4/2019 | Qi | B60N 2/0276 |
| 2020/0079248 A1 | * | 3/2020 | Yamamoto | B60N 2/002 |
| 2020/0245058 A1 | * | 7/2020 | Lee | H04R 9/025 |
| 2022/0089085 A1 | * | 3/2022 | Oh | B60Q 5/008 |

* cited by examiner

APPARATUS FOR GENERATING VIRTUAL EFFECT FOR ELECTRIC VEHICLE

CROSS REFERENCE TO RELATED APPLICATION

The present application claims under 35 U.S.C. § 119(a) the benefit of Korean Patent Application No. 10-2020-0179388, filed Dec. 21, 2020, the entire contents of which are incorporated by reference herein.

BACKGROUND

(a) Technical Field

The present disclosure relates to an apparatus for generating a virtual effect for an electric vehicle, more particularly, the apparatus for generating the virtual effect in which virtual vibration is produced, the virtual vibration simulating sensations of acceleration and deceleration, vibration during driving, shift shock, etc. of an internal combustion engine vehicle.

(b) Description of the Related Art

As is well known, an electric vehicle (EV) is a vehicle that runs using a motor. A powertrain of the electric vehicle includes: a batteiy that supplies electric power for driving the motor; an inverter connected to the battery for driving and controlling the motor; the motor, which is a vehicle driving source, connected to the battery via the inverter for charging and discharging; and a reducer that reduces torque of the motor for transmission to driving wheels.

In driving the motor of the electric vehicle, the inverter changes direct current (DC) supplied from the batteiy to alternating current (AC) and applies the alternating current to the motor through a power cable. In regenerative braking of the motor, the inverter changes alternating current generated from the motor to direct current and supplies the direct current to the battery so that the battery is charged.

Unlike a conventional internal combustion engine vehicle, an electric vehicle does not use a multi-speed transmission, but instead, the reducer using a fixed gear ratio is placed between the motor and the driving wheel. This is because unlike the internal combustion engine that has a wide range of energy efficiency distribution depending on an operating point and is able to provide a high torque only in a high-speed region, the motor has a relatively small difference in efficiency for an operating point and is able to achieve a low-speed high-torque only with the characteristics of the motor alone.

In addition, a vehicle equipped with the conventional internal combustion engine powertrain requires a starting mechanism, such as a torque converter or a clutch, because of the characteristics of the internal combustion engine that make it incapable of low-speed driving. In the powertrain of the electric vehicle, however, the motor is adept at low-speed driving, so that the starting mechanism is not needed. Because of the characteristics of the powertrain of the electric vehicle, an inherent vibration feature caused by a torsional damper, a dual mass flywheel, etc. used in the powertrain of the internal combustion engine vehicle does not occur.

The mechanical differences enable the electric vehicle to provide a smooth driving experience without interruption caused by shifting unlike the internal combustion engine vehicle. While the powertrain of the conventional internal combustion engine vehicle creates power by burning fuel, the powertrain of the electric vehicle creates power by driving the motor with the electric power of the battery. Therefore, unlike the torque of the internal combustion engine, the torque of the electric vehicle is substantially precise, smooth and has a rapid response.

Such characteristics of the electric vehicle are regarded as positive, but the absence of an internal combustion engine, a transmission, a clutch, etc. may result in boredom felt by a driver who wants to enjoy certain aspects of the driving experience. In the case of a high-performance vehicle, various effects caused by noises, physical vibration, and thermodynamic actions of an internal combustion engine may sometimes produce excitement in a driver.

No vibration during driving of the electric vehicle is certainly an advantage because no vibration enables a soft and smooth driving experience. Nevertheless, depending on a driver's disposition or a sporty character of a vehicle, it may be desirable to provide vibration for enjoyable driving.

Accordingly, there is a need for a technology that enables a driver of an electric vehicle, in which an internal combustion engine, a transmission, a clutch, etc. are not provided, to experience sensations of acceleration and deceleration, vibration during driving, shift shock, etc., which can be felt in an internal combustion engine vehicle, through vibration. In addition, there is a need for a technology for producing virtual vibration in conjunction with virtual sound that is produced and output in an electric vehicle.

The foregoing is intended merely to aid in the understanding of the background of the present disclosure, and is not intended to mean that the present disclosure falls within the purview of the related art that is already known to those skilled in the art.

SUMMARY

The present disclosure is directed to an apparatus for generating a virtual effect for an electric vehicle in which virtual vibration is produced, the virtual vibration simulating sensations of acceleration and deceleration, vibration during driving, shift shock, etc. of an internal combustion engine vehicle. In addition, the present disclosure is directed to providing an apparatus for generating a virtual effect for an electric vehicle in which virtual vibration in conjunction with virtual sound is produced.

Purposes of the present disclosure will not be limited to the above-described purposes, and other purposes that are not described herein will become apparent to one of ordinary skill in the art (i.e., those skilled in the art) to which the present disclosure pertains from the following description.

According to an embodiment of the present disclosure, there is provided an apparatus for generating a virtual effect of an electric vehicle, the apparatus including: a driving information detector configured to detect vehicle driving information in the electric vehicle; a controller configured to determine a characteristic of the virtual effect based on the vehicle driving information detected by the driving information detector, and configured to generate a virtual effect producing signal for producing the determined characteristic of the virtual effect; and a vibration actuator provided in a seat of the electric vehicle such that when the vibration actuator operates, a driver or a passenger who is in the seat experiences vibration, the vibration actuator being controlled by the virtual effect producing signal generated by the controller, so as to produce the vibration according to the determined characteristic of the virtual effect.

Herein, the driving information detector may include at least one of an accelerator pedal detector configured to detect a driver accelerator pedal input value, a speed detector configured to detect a vehicle powertrain speed, or a vehicle speed detector configured to detect a vehicle speed, and the controller may determine the characteristic of the virtual effect from at least one of: the driver accelerator pedal input value, the vehicle powertrain speed, or the vehicle speed.

In an embodiment of the present disclosure, the vehicle powertrain speed may be at least one of a rotational speed of a vehicle driving motor, a rotational speed of a driving wheel, or a rotational speed of a drive shaft.

In addition, in an embodiment of the present disclosure, the controller may determine the characteristic of the virtual effect from a torque command of a vehicle driving motor acquired by the detected vehicle driving information.

In addition, in an embodiment of the present disclosure, the characteristic of the virtual effect may include at least one of: an amount, an amplitude, a period, or a frequency band of the vibration to be produced by the vibration actuator.

In addition, in an embodiment of the present disclosure, a plurality of the vibration actuators may be placed in foam pads of a seat base and a backrest of the seat.

In addition, according to the embodiment of the present disclosure, the apparatus for generating the virtual effect for the electric vehicle may further include: a sound device configured to produce and output virtual sound in the electric vehicle, and controlled by the virtual effect producing signal generated by the controller, so as to produce the virtual sound according to the determined characteristic of the virtual effect.

Herein, the virtual sound may be virtual post-combustion sound simulating post-combustion sound coming from an exhaust system of an internal combustion engine vehicle, virtual engine sound simulating engine sound coming from an engine of the internal combustion engine vehicle, or virtual motor sound that is imagined coming from a vehicle driving motor.

In addition, the characteristic of the virtual effect for producing the virtual sound may include a starting point in time at which the virtual sound is output through the sound device, and may further include at least one of: a strength, duration, a time interval of the virtual sound, or a frequency band or a pitch that is how high or low a sound is.

In addition, in an embodiment of the present disclosure, the vibration actuator may include: a casing having an inner space therein; a coil placed inside the casing and configured to receive a driving current, the coil together with the casing constituting a high-frequency exciter; a yoke placed inside the casing; a first magnet placed to be in contact with the yoke, the first magnet together with the yoke constituting a low-frequency exciter; a second magnet placed to be in contact with the coil; and a pole piece intervening between the first magnet and the second magnet, and configured to make magnetic flux generated from the first magnet and the second magnet flow into a magnetic gap.

Herein, the casing may include a first casing and a second casing that are assembled to each other to form the inner space, and the coil may be placed at an inner side of the first casing so that the first casing and the coil constitute the high-frequency exciter.

In addition, the vibration actuator may further include a suspension member placed between the casing and the yoke.

In addition, in an embodiment of the present disclosure, the vibration actuator may include: a casing having an inner space therein; a yoke placed inside the casing; a magnet placed to be in contact with a first surface of the yoke, the magnet together with the yoke constituting a low-frequency exciter; a drive casing coupled at an inner side of the casing; a coil coupled to the drive casing to be in contact with each other and configured to receive a driving current, the coil together with the drive casing constituting a high-frequency exciter; and a pole piece intervening between the magnet and the coil, and configured to make magnetic flux generated from the magnet flow into a magnetic gap.

Herein, the drive casing may be in a ring shape, and the drive casing may be provided with a circumferential portion from which multiple protrusions arranged at predetermined intervals along a circumferential direction extend downward.

In addition, the vibration actuator may further include: a spring of which a central portion is coupled to the yoke and of which an edge portion is coupled to a peripheral fixing structure in the seat so that the spring elastically supports the low-frequency exciter and regulates lateral movement with respect to the low-frequency exciter.

According to the apparatus for generating the virtual effect for the electric vehicle according to the present disclosure, the virtual vibration simulating sensations of acceleration and deceleration, vibration during driving, shift shock, etc. of an internal combustion engine vehicle can be produced in the electric vehicle. In addition, the virtual vibration in conjunction with the virtual sound can be produced in the electric vehicle.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of embodiments of the present disclosure are only for illustrative purposes of the embodiments according to the present disclosure, and the embodiments according to the present disclosure may be implemented in various forms. Further, the present disclosure should not be construed as being limited to the following embodiments, but should be construed as including all changes, equivalents, and replacements included in the spirit and the scope of the present disclosure.

In the meantime, terms "first", "second", etc. used in the present disclosure can be used to describe various elements, but the elements are not to be construed as being limited to the terms. These terms are only used to distinguish one element from another element. For instance, a first element could be termed a second element without departing from the scope of the present disclosure. Similarly, the second element could also be termed the first element.

It will be understood that when an element is referred to as being "coupled" or "connected" to another element, the former can be directly coupled or connected to the latter or intervening elements may be present therebetween. In contrast, it will be understood that when an element is referred to as being "directly coupled" or "directly connected" to another element, there are no intervening elements present. Other words used to describe the relationship between elements, such as "between", "directly between", "adjacent", "directly adjacent", etc., should be construed in the same way.

Throughout the specification, the same reference numerals refer to the same elements. The terms used herein are provided to describe the embodiments but not to limit the present disclosure. In the specification, the singular forms include plural forms unless particularly mentioned. Hereinafter, exemplary embodiments of the present disclosure will be described in detail with reference to the accompanying drawings.

The present disclosure is directed to providing an apparatus for generating a virtual effect for an electric vehicle in which a virtual effect that simulates sound and vibration occurring in a non-electric vehicle, such as an internal combustion engine vehicle, is produced and generated. Herein, the non-electric vehicle refers to a vehicle of a type other than an electric vehicle. In particular, the non-electric vehicle refers to a vehicle equipped with a powertrain different from a powertrain of an electric vehicle.

For example, the non-electric vehicle is an internal combustion engine vehicle equipped with an internal combustion engine powertrain. In the following description, an internal combustion engine and an engine have the same meaning, which is a technical detail easily understood by those skilled in the art.

In the present disclosure, the virtual effect may be virtual sound and virtual vibration. In particular, in the present disclosure, the virtual effect does not actually occur in a known electric vehicle, and may refer to virtual sound and virtual vibration that simulate sound and vibration occurring in a non-electric vehicle, such as an internal combustion engine vehicle.

In the present disclosure, the virtual sound and the virtual vibration are produced through a sound device and a vibration actuator, respectively, provided in the electric vehicle. It is be clarified that the virtual sound and the virtual vibration are virtual effects simulating sound and vibration of a non-electric vehicle, and are actually produced through the sound device and the vibration actuator, respectively, so that a driver or a passenger is able to actually experience the sound and the vibration in an electric vehicle to which the present disclosure applies.

An apparatus for generating a virtual effect according to the present disclosure includes: a sound device configured to produce and output the virtual sound; and a vibration actuator producing the virtual vibration. The vibration actuator may produce and provide, in an electric vehicle, the virtual vibration that simulates sensations of acceleration and deceleration, vibration during driving, shift shock, etc. of a non-electric vehicle, such as an internal combustion engine vehicle, etc. Further, as will be described later, the vibration actuator may produce and provide the virtual vibration in conjunction with the virtual sound.

In the present disclosure, the vibration actuator may be placed in a seat of a vehicle. Herein, the seat may be any seat in the vehicle, including a driver's seat, a front passenger seat, a rear seat, etc. In the present disclosure, the vibration actuator placed in the seat operates according to a virtual effect producing signal generated from a controller (a first controller described later) and produces vibration. That is, in the present disclosure, the controller controls operation of the vibration actuator by generating the virtual effect producing signal for producing desired vibration. Thus, sitting on the seat, the driver or the passenger is able to physically feel the vibration produced by the vibration actuator.

Hereinafter, in describing an embodiment of the present disclosure, a vibration actuator placed in a seat will be described first in detail.

Figure 1A:
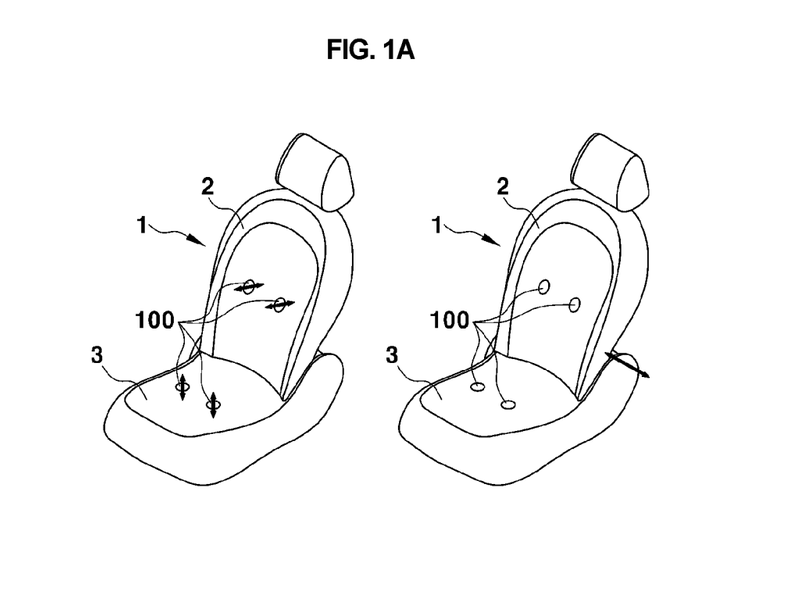
FIG. 1A is a diagram schematically showing positions of vibration actuators placed in a seat, in an apparatus for generating a virtual effect according to an embodiment of the present disclosure.
Figure 1B:
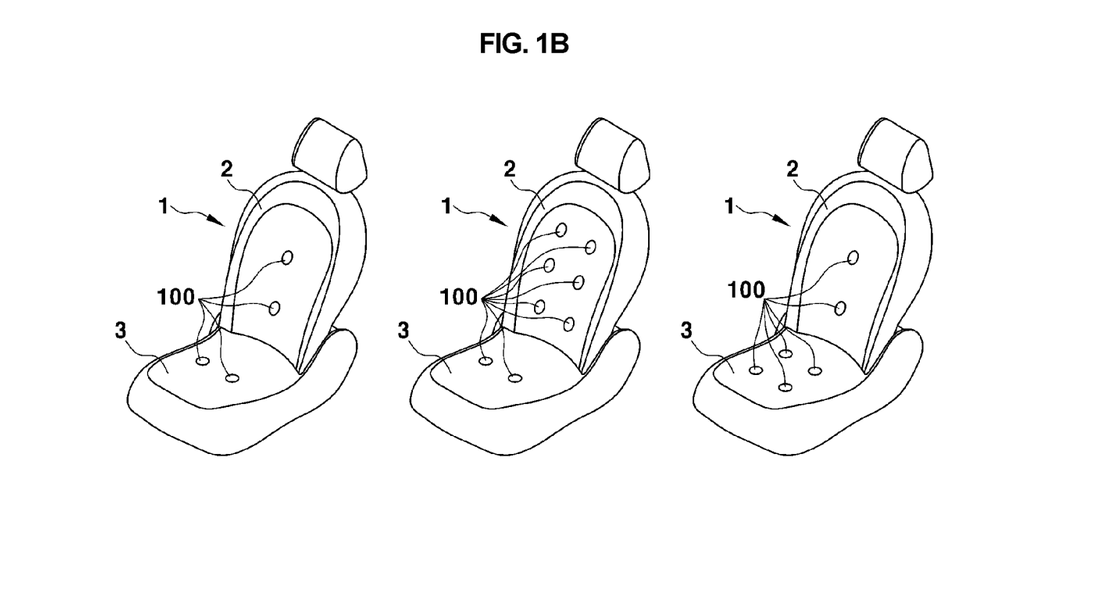
FIG. 1B is a diagram showing several examples differing in the number and positions of vibration actuators, in an apparatus for generating a virtual effect according to an embodiment of the present disclosure.

FIG. 1A is a diagram schematically showing positions of vibration actuators placed in a seat, in an apparatus for generating a virtual effect according to an embodiment of the present disclosure. In addition, FIG. 1B is a diagram showing several examples differing in the number and positions of vibration actuators, in an apparatus for generating a virtual effect according to an embodiment of the present disclosure.

As described above, according to the embodiment of the present disclosure, the apparatus for generating the virtual effect includes a vibration actuator 100 embedded in a seat 1, as an element for producing vibration in an electric vehicle like in an internal combustion engine vehicle. Herein, according to the embodiment of the present disclosure, the apparatus for generating the virtual effect for the electric vehicle may include multiple vibration actuators 100 embedded in the seat 1.

Herein, as shown in FIG. 1A, a determined number of vibration actuators 100 are placed in a backrest 2 and a seat base 3 of the seat 1 of the vehicle. FIG. 1A shows that two vibration actuators 100 are placed in the backrest 2 and the seat base 3 each. The number of vibration actuators 100 is for illustrative purposes and the present disclosure is not limited thereby. The numbers or positions of the vibration actuators 100 placed in the seat 10 may vary as shown in the examples of FIG. 1B.

The left figure of FIG. 1A shows an example in which the vibration actuators 100 are placed such that the vibration actuators 100 placed in the backrest 2 produce vibration in a forward-backward direction (see the arrows) with respect to a vehicle body direction and the vibration actuators placed in the seat base 3 produce vibration in an upward-downward direction (see the arrows) with respect to the vehicle body direction. In addition, the right figure of FIG. 1A shows an example in which the vibration actuators 100 are placed such that all the vibration actuators 100 placed in the backrest 2 and the seat base 3 produce vibration in a left-right direction (see the arrows) with respect to the vehicle body direction.

In an embodiment of the present disclosure, the virtual vibration simulating shift shock may be produced. To this end, when there is a request for shifting according to control logic of the controller for forming virtual shift shock, the controller generates a virtual effect producing signal for producing and generating the virtual effect. Herein, by the virtual effect producing signal generated from the controller, the vibration actuators 100 inside the seat 1 operate and produce vibration, so that the electric vehicle is able to produce vibration shock occurring when shifting is performed in a transmission of an internal combustion engine vehicle.

In addition, when the electric vehicle drives at constant speed or accelerates, the controller determines the volume of the virtual sound based on an accelerator pedal input value (APS value) of the driver, a motor torque command, or a powertrain speed, and determines the amount of vibration and exciting force of vibration to be produced through the vibration actuators.

Hereinafter, a configuration of a vibration actuator that may be used in an apparatus for generating a virtual effect for an electric vehicle according to an embodiment of the present disclosure will be described in detail with reference to the following figure.

Figure 2:
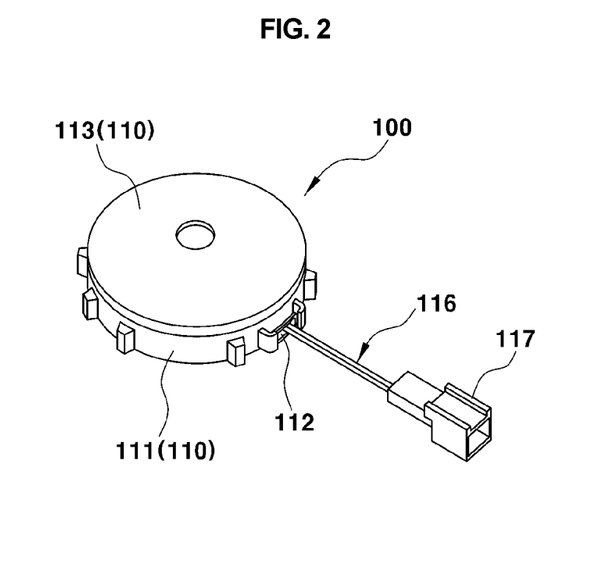
FIG. 2 is an assembled perspective view showing a vibration actuator according to an embodiment of the present disclosure.
Figure 3:
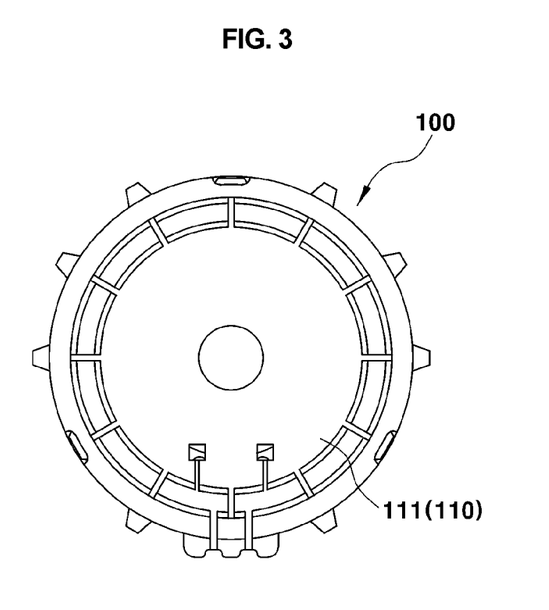
FIG. 3 is a bottom view showing a vibration actuator according to an embodiment of the present disclosure.
Figure 4:
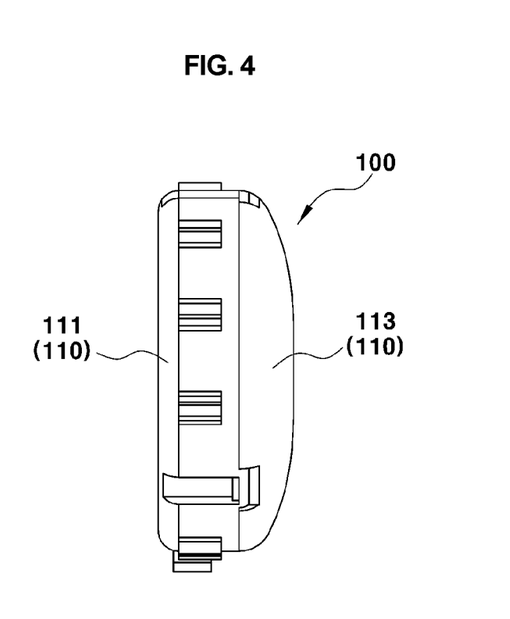
FIG. 4 is a side view showing a vibration actuator according to an embodiment of the present disclosure.
Figure 5:
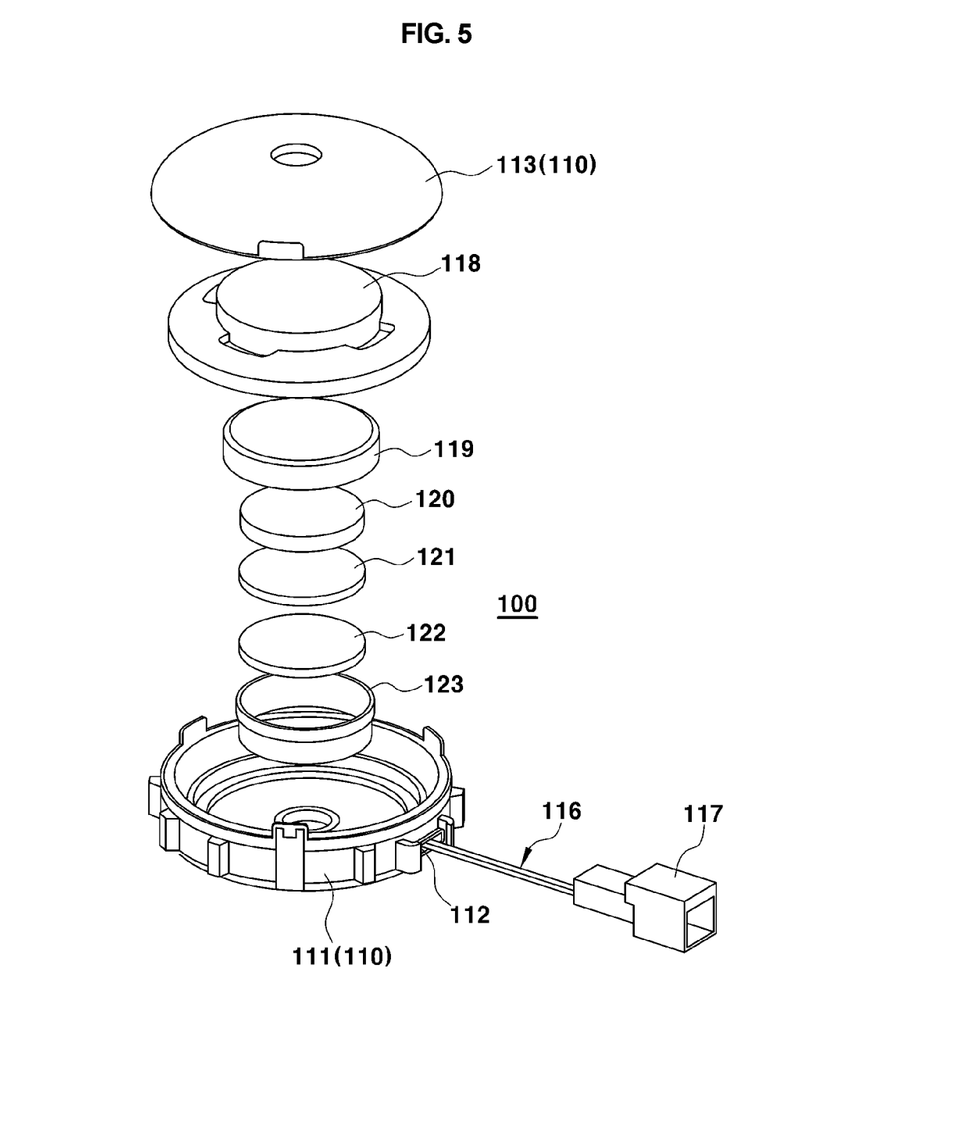
FIG. 5 is an exploded perspective view showing a vibration actuator according to an embodiment of the present disclosure.

FIG. 2 is an assembled perspective view showing a vibration actuator according to an embodiment of the present disclosure. FIG. 3 is a bottom view showing a vibration actuator according to an embodiment of the present disclosure. FIG. 4 is a side view showing a vibration actuator according to an embodiment of the present disclosure. In addition, FIG. 5 is an exploded perspective view showing a vibration actuator according to an embodiment of the present disclosure. The vibration actuator 100 illustrated in FIGS. 2 to 5 is embedded in a seat, and is small and lightweight.

In the apparatus for generating the virtual effect for the electric vehicle according to the embodiment of the present disclosure, the vibration actuators 100 may be placed in the backrest 2 and the seat base 3 as described above (see FIGS. 1A and 1B). Further, the vibration actuators 100 may be placed inside respective foam pads of the backrest 2 and the seat base 3. As described above, in the case in which the vibration actuators 100 are placed inside the foam pads of the seat 1, when the vibration actuators 100 operate, the driver or the passenger who is in the seat physically feels vibration produced by the vibration actuators.

In an embodiment of the present disclosure, the vibration actuator 100 may have a dualistic configuration of a low-frequency exciter and a high-frequency exciter. Further, the vibration actuator 100 may be a hybrid lightweight actuator in which rubber and plastic for light weight and an aluminum-based metal material are used together and applied according to components.

As shown in FIGS. 2-5, for example, the vibration actuator 100 includes a casing 110, and the casing 110 includes a first casing 111 and a second casing 113 that are assembled to each other to form an airtight inner space. With the first casing 111 and the second casing 113 assembled, the inner space formed therebetween holds main components of the vibration actuator 100 as shown in FIG. 5. The first casing 111 and the second casing 113 may be manufactured by being formed of synthetic resin. The first casing 111 may be formed of a lightweight silicone-based material.

Regarding the vibration actuator 100, a wire assembly 116 is connected to a terminal 112 of the first casing 111 and a wire (not shown) extending from a drive circuit unit (not shown) is connected to a connector 117 of the wire assembly 116. Thus, when an electrical signal (actuator driving current) for producing vibration is applied through the drive circuit unit inside or outside the controller according to the virtual effect producing signal generated by the controller (the first controller described later), the electrical signal is input from the drive circuit unit to the vibration actuator 100 via the wire (not shown) and the wire assembly 116.

That is, operation of the vibration actuators 100 is controlled according to the electrical signal so that the vibration actuators produce the desired vibration. Herein, the electrical signal may be an actuator driving current controlled according to the virtual effect producing signal, and the current controlled by the controller is applied to the vibration actuators 100, so that the vibration actuators produce desired vibration.

Referring to FIG. 5, the wire assembly 116 for applying an electrical signal (current) is connected to the terminal 112 of the first casing 111. Herein, the wire assembly 116 is electrically connected to a coil 123 through the terminal 112 and the coil 123 is placed in the inner space of the first casing 111. That is, an electrical signal (current) applied through the wire assembly 116 may be transmitted to the coil 123, and thus the coil 123 may be driven by an electrical signal applied from the controller.

In an embodiment of the present disclosure, the vibration actuator 100 may include a yoke 119, a magnet 120, and the coil 123 conductive. The coil 123 may be provided in the same form as a voice coil of a speaker. In an embodiment of the present disclosure, the yoke 119 of the vibration actuator 100 may be formed of an aluminum-based alloy material, and a mixture of aluminum and copper may be used for the coil 123.

In the vibration actuator 100, the yoke 119 and the magnet 120 constitute the low-frequency exciter (low-frequency-band driving part) and the first casing 111 and the coil 123 constitute the high-frequency exciter (high-frequency-band driving part). The high-frequency exciter generates high-frequency vibration in a high frequency band, and the low-frequency exciter generates low-frequency vibration in a low frequency band.

In the vibration actuator 100, a suspension member 118 is placed at an inner side of the second casing 113, and the suspension member 118 may be formed of silicone, or the like. In addition, the yoke 119 is placed to be in contact with the suspension member 118, and a first magnet 120 that is a main magnet is placed to be in contact with the yoke 119. Therefore, a structure in which the suspension member 118 is placed between the second casing 113 of the casing 110 and the yoke 119 is provided, and the yoke 119 and the first magnet 120 constitute the low-frequency exciter. In addition, the coil 123 is placed at an inner side of the first casing 111, and a sub-magnet, that is, a second magnet 122, is placed to be in contact with the coil 123. A pole piece 121 intervenes between the first magnet 120 and the second magnet 122.

As described above, in the embodiment of the present disclosure, the vibration actuator 100 is a small hybrid lightweight actuator that is composed of both the high-frequency exciter and the low-frequency exciter and includes the following: the suspension member 118 formed of a silicone rubber material, the coil 123 and the yoke 119 formed of aluminum, the casing 110 formed of plastic synthetic resin, and the like.

In the high-frequency exciter, the coil 123 placed to be in contact with the first casing 111 makes an electrical signal applied through the terminal 112 of the first casing converted into mechanical vibration, and the pole piece 121 makes magnetic flux generated from the first magnet 120 and the second magnet 122 flow into a magnetic gap. As described above, although the coil 123 makes an electrical signal converted into mechanical vibration, the coil 123 itself is not a component performing vibration excitation.

Figure 6:
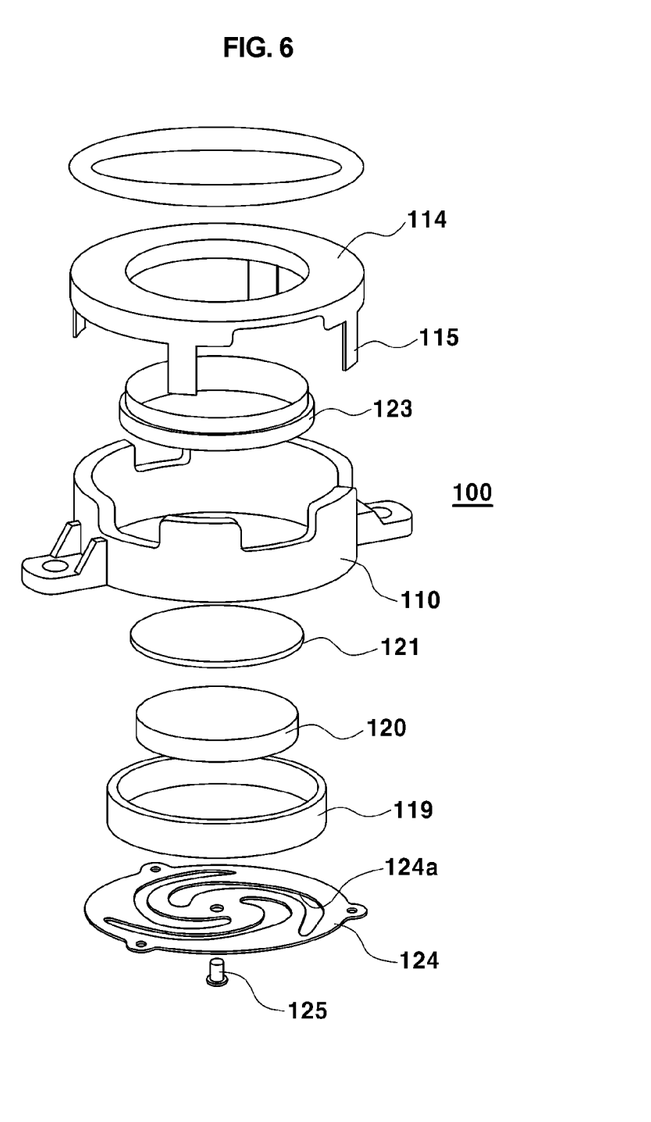
FIG. 6 is an exploded perspective view showing another example of a vibration actuator in an apparatus for generating a virtual effect according to an embodiment of the present disclosure.

FIG. 6 is an exploded perspective view showing another example of a vibration actuator in an apparatus for generating a virtual effect according to an embodiment of the present disclosure. Comparing the vibration actuator shown in FIGS. 2 to 5 with the vibration actuator 100 shown in FIG. 6, there are slight differences in shape, form, configuration, etc., but the actuators have common features because both the actuators are small hybrid lightweight actuators each composed of a low-frequency exciter and a high-frequency exciter and formed using silicone, aluminum, plastic, etc. together.

Describing the example of FIG. 6, a side of a casing 110 is provided with a terminal to which a wire assembly (not shown) is connected, and a yoke 119 and a magnet 120 coupled to be in contact with each other is placed at an inner side of the casing 110. While the magnet 120 is coupled to a first surface of the yoke 119 to be in contact with each other, a spring 124 is fastened to a second surface of the yoke 119 by using a fastener, such as a screw 125, a bolt, etc., thereby forming an integrated combination. The spring 124 is a plate-shaped member and may have a shape in which multiple thin long holes 124a are formed.

Even in the example of FIG. 6, when the yoke 119 and the magnet 120 constitute a low-frequency exciter at which low-frequency vibration in a low frequency band is generated, separately from the low-frequency exciter, a drive casing 114 and a coil 123 coupled to be in contact with each other constitute a high-frequency exciter having characteristics of high-frequency excitation in a high frequency band. In addition, a pole piece 121 is placed between the low-frequency exciter and the high-frequency exciter, specifically, between the magnet 120 of the low-frequency exciter and the coil 123 of the high-frequency exciter.

The drive casing 114 is coupled at the inner side of the casing 110, and is formed of a silicone-based material. The drive casing 114 may be provided in a ring shape and along the circumferential portion of the drive casing 114, long protrusions 115 are provided. Herein, the multiple protrusions 115 may be formed to be arranged at predetermined intervals along the circumferential direction. Each of the protrusions 115 has a long shape extending from the circumferential portion of the drive casing 114 toward a direction (downward in FIG. 6) perpendicular to a radial direction.

In the example of FIG. 6, the functions or roles of the components constituting the vibration actuator 100 are not different those in the examples of FIGS. 2 to 5. The casing 110 is a body for fixing a magnetic circuit and protects the internal components from external impact. The terminal 112 transmits an electrical signal to the coil 123, and the coil 123 makes the electrical signal converted into mechanical vibration.

As described in the examples of FIGS. 2 to 5, although the coil 123 makes an electrical signal converted into mechanical vibration, the coil itself is not a component performing vibration excitation. The magnet 120 generates magnetic flux. Combined with each other, the magnet 120 and the yoke 119 function as a low-frequency exciter that vibrates vertically. The pole piece 121 between the magnet 120 and the coil 123 makes the magnetic flux generated from the magnet flow into a magnetic gap.

In addition, in the example of FIG. 6, the spring 124 is further provided as described above. The spring 124 is a member forming vibration characteristics. Herein, a central portion of the spring 124 may be fastened to the yoke 119 of the low-frequency exciter by using a bolt, a screw 125, etc., thereby forming an integrated combination. Herein, the yoke 119 may be formed of an aluminum-based alloy material. Further, an edge portion of the spring 124 may be coupled to a peripheral fixing structure in the seat. The fixing structure may be a frame in the backrest and the seat base of the seat. In this structure, in addition to form vibration characteristics, the spring 124 performs vertical elastic support and regulates the lateral movement with respect to the low-frequency exciter at which vibration is generated.

Accordingly, when vibration characteristics are applied by the spring 124, the low-frequency exciter including the yoke 119 shows excitation characteristics caused by low-frequency natural vibration. That is, when the vibration characteristics are formed by the spring 124, actual vibration occurs at the low-frequency exciter (the magnet and the yoke) and the pole piece 121. That is, when low-frequency exciter vibrates vertically, the vibration is transmitted to the high-frequency exciter, so that the high-frequency exciter also generates vibration. Herein, when an electrical signal is converted into mechanical vibration by the coil 123, the drive casing 114 formed of a silicone-based material and the protrusions 115 in the high-frequency exciter have excitation characteristics caused by high-frequency natural vibration Although the low-frequency exciter (low-frequency-band driving part) and the high-frequency exciter (high-frequency-band driving part) have been described separately, the low-frequency exciter and the high-frequency exciter do not generate individual and independent vibrations.

As described above, when an electrical signal (current) is applied to the coil 123, the coil 123 makes the electrical signal converted into mechanical vibration and the coil itself does not perform vibration excitation. While the current flows to the coil 123, the low-frequency exciter and the pole piece 121 interact to produce vertical vibration. As described above, when the low-frequency exciter vibrates vertically, the vibration is transmitted to the high-frequency exciter, so that the high-frequency exciter also shows excitation characteristics.

In the meantime, the apparatus for generating the virtual effect according to the present disclosure may generate virtual vibration in conjunction with virtual sound in an electric vehicle. To this end, the controller determines the characteristics of the virtual effect based on vehicle driving information and generates a virtual effect producing signal based on information on the determined characteristics of the virtual effect.

In addition, the controller makes operation of the sound device controlled according to the generated virtual effect producing signal so that the sound device outputs virtual sound, and simultaneously makes operation of the vibration actuators controlled according to the virtual effect producing signal so that the vibration actuators produce and output desired virtual vibration.

In the present disclosure, the virtual sound produced and output by the sound device and the virtual vibration artificially produced by the vibration actuators may be sound and vibration that are produced in the electric vehicle according to vehicle driving states, and may be virtual sound and vibration simulating sound and vibration from a vehicle, for example, an internal combustion engine vehicle, of which the powertrain is different from that of a vehicle to which the present disclosure applies.

In the present disclosure, the virtual sound may be motor sound coming from a motor that is a driving device (power machine) of an electric vehicle during driving of the electric vehicle. Herein, the motor sound is virtual motor sound that is not actual sound of the motor, and is virtual driving sound of the motor that is imagined coming from the motor depending on driving conditions during driving of the electric vehicle.

Alternatively, in the present disclosure, the virtual sound may be virtual engine sound that simulates the engine sound coming from an engine during driving which is a driving device (power machine) of a powertrain, for example, an internal combustion engine vehicle powertrain, other than an electric vehicle powertrain. Since an electric vehicle does not have an engine, the virtual engine sound is not actual sound coming from the electric vehicle, but virtual sound. Further, the virtual engine sound is virtual driving sound of an engine that is imagined coming from the electric vehicle depending on driving conditions during driving of the electric vehicle.

In addition, in the present disclosure, the virtual vibration produced corresponding to the vehicle driving information may simulate engine vibration or vehicle vibration, or may simulate shift shock. That is, the virtual vibration produced and realized in the present disclosure may be virtual vibration simulating driving vibration that occurs while an internal combustion engine vehicle drives at constant speed, accelerates, or decelerates, or may be vibration simulating shift shock of an internal combustion engine vehicle.

For example, when the control logic of the controller for realizing a virtual shifting function generates a shifting signal, the vibration actuators are operated to produce vibration for producing shift shock. Alternatively, the vibration produced and realized in the present disclosure may simulate the vibration caused by post combustion in an internal combustion engine vehicle.

In addition, in the present disclosure, an actual vehicle driving condition, that is, the vehicle driving information, of the electric vehicle used in generating the virtual effect producing signal may be an accelerator pedal input value of the driver, a motor torque command, a powertrain speed, or the like. Alternatively, the vehicle driving information used in generating the virtual effect producing signal may be a vehicle speed.

Among virtual sounds, the virtual driving sound, that is, the virtual motor sound or the virtual engine sound, may be classified into acceleration driving sound, constant-speed driving sound, and deceleration driving sound according to working an accelerator pedal by the driver. It may be set to output the acceleration driving sound when the accelerator pedal is pressed for operation, or to output the constant-speed driving sound or the deceleration driving sound when the pressure of the accelerator pedal is relaxed.

The powertrain speed is a rotational speed of a vehicle powertrain component sensed by a sensor, and may be a rotational speed (motor speed) of a driving motor, a rotational speed (driving wheel speed) of a driving wheel, or a rotational speed (drive shaft speed) of a drive shaft. Alternatively, as powertrain speed information, a virtual engine speed that is a virtual variable may be used. The virtual engine speed may be calculated by the controller at a variable multiple value of the powertrain speed sensed by a sensor. Herein, the powertrain speed sensed by the sensor may be a motor speed. Herein, a value of a coefficient multiplied by the motor speed so as to calculate the virtual engine speed may be a value determined depending on a virtual transmission, its gear ratio model, and a virtual current gear position.

In addition, there is known a control method of producing virtual shift shock for an electric vehicle so as to produce and realize a multi-speed shift shock by controlling torque of a driving motor in an electric vehicle having no multi-speed transmission. In addition, it is known that in a control process for producing virtual shift shock for an electric vehicle, a virtual engine speed is used as one of virtual variables required for producing and realizing a multi-speed shift shock.

The virtual engine speed that is one of virtual variables used to produce and realize a multi-speed shift shock as described above may be used as a virtual variable for outputting the virtual sound in the present disclosure. In an embodiment of the present disclosure, the controller (the first controller described later) may determine a virtual engine speed by using a virtual vehicle speed and gear ratio information of a virtual current gear position.

Herein, by using an actual motor speed that is one piece of actual variable (input variable) information and a virtual final-reduction gear ratio, the virtual vehicle speed may be calculated as a value that is in direct proportion to the actual motor speed. Herein, the virtual final-reduction gear ratio may be a value preset in the controller. In an embodiment of the present disclosure, a virtual vehicle speed may be calculated using the actual motor speed measured during driving of the electric vehicle and the virtual final-reduction gear ratio, and a virtual engine speed may be calculated in real time by the virtual vehicle speed.

In addition, the virtual engine speed may be acquired from the product of the virtual vehicle speed and a virtual gear ratio of the virtual current gear position. Alternatively, the virtual engine speed may be acquired from the product of the powertrain speed, such as the motor speed, etc., and the virtual gear ratio of the virtual current gear position.

The virtual current gear position may be determined depending on a shift schedule map preset in the controller from a virtual vehicle speed and an accelerator pedal input value (APS value). When the virtual current gear position is determined as described above, a virtual gear ratio corresponding to the gear position and a virtual vehicle speed or a motor speed are used to calculate a virtual engine speed in real time.

When the virtual current gear position is determined from the virtual vehicle speed and the accelerator pedal input value as described above, a virtual engine speed is calculated based on information on the determined virtual current gear position. Herein, based on information on the acquired virtual engine speed, virtual sound may be produced in the electric vehicle. As described above, gear position information determined from the virtual vehicle speed and the accelerator pedal input value may be used, but instead of the gear position, a gear position selected when the driver shifts gears with a shift controller, such as a shift lever, may be used in producing virtual sound.

Figure 7:
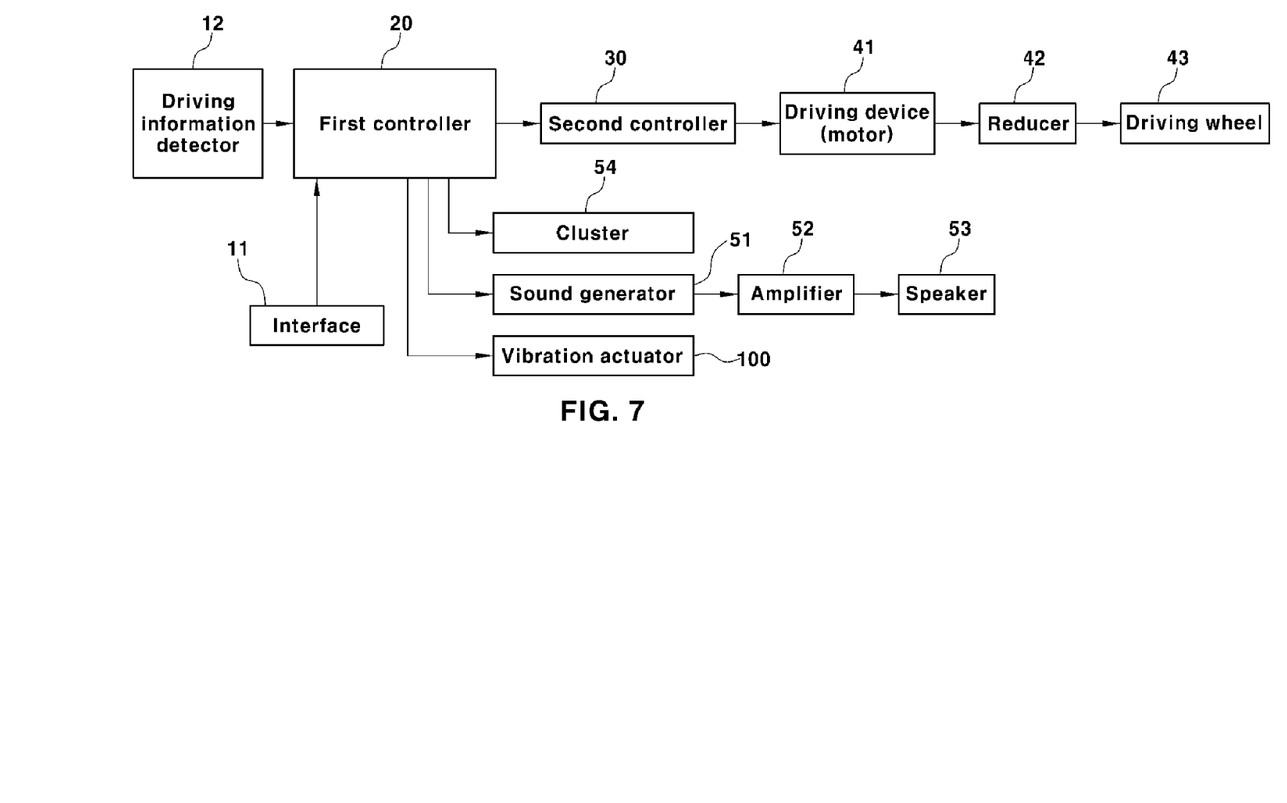
FIG. 7 is a block diagram showing a configuration of an apparatus for generating a virtual effect according to an embodiment of the present disclosure.

FIG. 7 is a block diagram showing a configuration of an apparatus for generating a virtual effect according to an embodiment of the present disclosure. As shown in FIG. 7, according to the embodiment of the present disclosure, the apparatus for generating the virtual effect includes a driving information detector 12, a first controller 20, and at least one vibration actuator 100. The driving information detector 12 detects vehicle driving information. The first controller 20 determines, based on the vehicle driving information detected by the driving information detector 12, characteristics of a virtual effect while an electric vehicle drives, and then generates and outputs a virtual effect producing signal for producing the virtual effect according to the determined characteristics of the virtual effect. The at least one vibration actuator 100 operates to produce the virtual vibration according to the virtual effect producing signal output from the first controller 20.

Further, the apparatus may include a sound device operating to produce and output the virtual sound according to the virtual effect producing signal output from the first controller 20. Herein, the sound device may include a sound generator 51, an amplifier 52, and a speaker 53. The sound generator 51 processes a sound source signal and the virtual effect producing signal to generate and output a sound signal for producing the virtual sound. The amplifier 52 and the speaker 53, such as a woofer, etc., operate according to the sound signal and output the virtual sound. The speaker 53 may be placed in the interior of the electric vehicle or the exterior thereof or both. Preferably, multiple speakers 53 may be placed at the electric vehicle and used for outputting the virtual sound.

In addition, in the present disclosure, the first controller 20 generates and outputs a torque command based on the vehicle driving information. A second controller 30 controls operation of a driving device 41 according to the torque command output from the first controller 20. The first controller 20 and the second controller 30 are controllers that are involved in a control process for producing the virtual sound and the virtual vibration in the electric vehicle and in a process of controlling driving of the electric vehicle.

In the following description, controllers are described distinguishing between the first controller 20 and the second controller 30, but the control process for producing the virtual sound and the virtual vibration and the process of controlling driving according to the present disclosure may be performed by a single integrated control element instead of the multiple controllers.

The multiple controllers and the single integrated control element are collectively referred to as a controller, and such a controller may perform a control process for outputting the virtual sound and producing the virtual vibration of the present disclosure described below. Herein, the controller may collectively refer to both the first controller 20 and the second controller 30.

Further, according to the present disclosure, the apparatus for generating the virtual effect for the electric vehicle may include an interface 11. The interface 11 is provided such that the driver is able to input either ON or OFF of a function of generating the virtual effect, wherein the function includes a function of outputting the virtual sound and a function of producing the virtual vibration In an embodiment of the present disclosure, as the interface 11, any mechanical device or touch screen may be used enabling a driver in an electric vehicle to manipulate ON and OFF of the function of generating the virtual effect. For example, the interface 11 may be a manipulation device, such as a button, a switch, etc., provided in an electric vehicle, or may be an input device of an audio, video, navigation (AVN) system, a touch screen, etc.

The interface 11 may be connected to the first controller 20. Accordingly, when the driver inputs ON or OFF manipulation through the interface 11, an on signal or an off signal from the interface 11 is input to the first controller 20. That is, the first controller 20 is made to recognize the ON or OFF manipulation state, input from the driver, of the function of generating the virtual effect.

In the present disclosure, the function of generating the virtual effect during driving of the electric vehicle, specifically, the function of outputting the virtual sound by using the sound device including the sound generator 51, the amplifier 52, and the speaker 53, and the function of producing the virtual vibration by using the at least one vibration actuator 100, may be performed only when the driver inputs ON through the interface 11.

In addition, in a case in which the interface 11 is an input device for the electric vehicle provided therein, the driver is able to manipulate ON and OFF of the function of generating the virtual effect, through a mobile device as another example of the interface. The mobile device needs to be communicatively connected to an in-vehicle device, for example, the first controller 20. To this end, an input/output communication interface for communication connection between the mobile device and the first controller 20 is used.

The driving information detector 12 is a component that detects the vehicle driving information required for generating the torque command in the electric vehicle as well as vehicle driving information (driving variable information) required for performing the functions of outputting the virtual sound and producing the virtual vibration. In an embodiment of the present disclosure, the driving information detector 12 is for detecting the vehicle driving information for generating the virtual effect producing signal. The driving information detector 12 may include one of the following: an accelerator pedal detector configured to detect accelerator pedal input information (the accelerator pedal input value) depending on the driver's manipulation of the accelerator pedal; and a speed detector configured to detect the powertrain speed of the electric vehicle.

Herein, the accelerator pedal detector may be a common accelerator position sensor (APS) that is placed at the accelerator pedal and outputs an electrical signal according to the state of the accelerator pedal manipulated by the driver. In addition, the speed detector is for acquiring information on the powertrain speed of the electric vehicle. The powertrain speed may be a rotational speed (motor speed) of a motor, i.e., a driving motor 41, driving the electric vehicle, a rotational speed (driving wheel speed) of a driving wheel 43, or a rotational speed (drive shaft speed) of a drive shaft. Herein, the speed detector may be a resolver placed at the driving motor 41, a wheel speed sensor placed at the driving wheel 43, or a sensor sensing the drive shaft speed.

In addition, in the present disclosure, the vehicle driving information may be used in generating the torque command and the virtual effect producing signal, and may include a vehicle speed. In this case, the driving information detector 12 may include a vehicle speed detector for detecting a current driving vehicle speed, and the vehicle speed detector may include the wheel speed sensor placed at the driving wheel 43 of the electric vehicle.

In addition, the first controller 20 determines and generates a torque command based on the vehicle driving information. Further, the first controller 20 determines characteristics of a virtual effect based on the vehicle driving information or of the vehicle driving information and virtual variable information, and generates and outputs a virtual effect producing signal according to the determined characteristics of the virtual effect. Herein, the virtual variable information may be a virtual engine speed, a virtual vehicle speed, a virtual gear position, or the like.

The torque command may be a motor torque command that is determined and generated based on the vehicle driving information collected during driving of a common electric vehicle. The first controller 20 may be a vehicle control unit (VCU) that generates the motor torque command based on the vehicle driving information in a common electric vehicle.

The second controller 30 may be a controller that receives the torque command transmitted from the first controller 20 and controls operation of the driving device 41. In the present disclosure, the driving device 41 is a motor connected to the driving wheel 43 of the electric vehicle and driving the electric vehicle. The second controller 30 may be a known motor control unit (MCU) that drives the motor 41 through an inverter in a common electric vehicle and controls the driving of the motor 41.

In FIG. 7, the torque that the motor, which is the driving device 41, outputs is reduced by a reducer 42 and the resulting torque is transmitted to the driving wheel 43. In FIG. 7, reference numeral 54 denotes a cluster placed in front of the driver's seat of the electric vehicle. Through the cluster 54, a current vehicle speed, a current virtual engine speed, a virtual gear position, etc. may be displayed.

In the present disclosure, the virtual effect producing signal used for producing and outputting the virtual sound and the virtual vibration may be a signal matched to the characteristics of the virtual sound and the virtual vibration in conjunction therewith under a current vehicle driving condition. As described above, when the controller generates and outputs the virtual effect producing signal matched to the characteristics of the virtual sound based on the vehicle driving information, the sound device outputs desired virtual sound by using the sound source signal and the virtual effect producing signal. In addition, the vibration actuator 100 outputs the virtual vibration in conjunction with the virtual sound by using the virtual effect producing signal.

Figure 8:
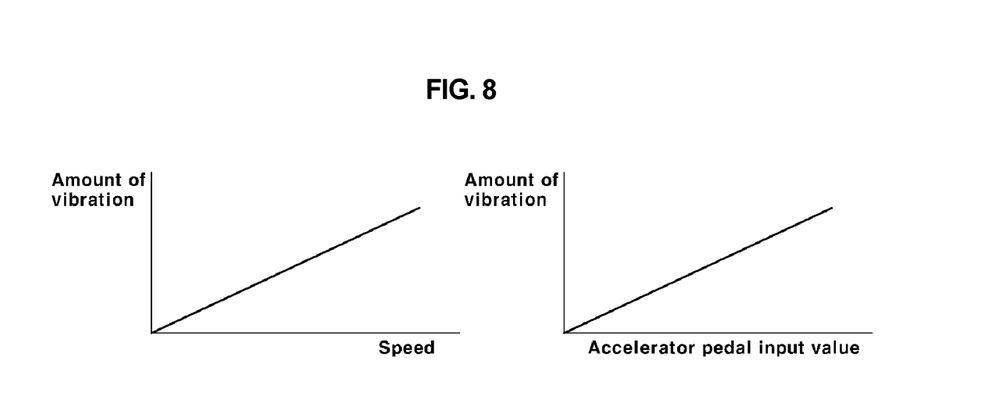
FIGS. 8 and 9 are diagrams showing examples of controlling virtual vibration and virtual sound according to an embodiment of the present disclosure.
Figure 9:
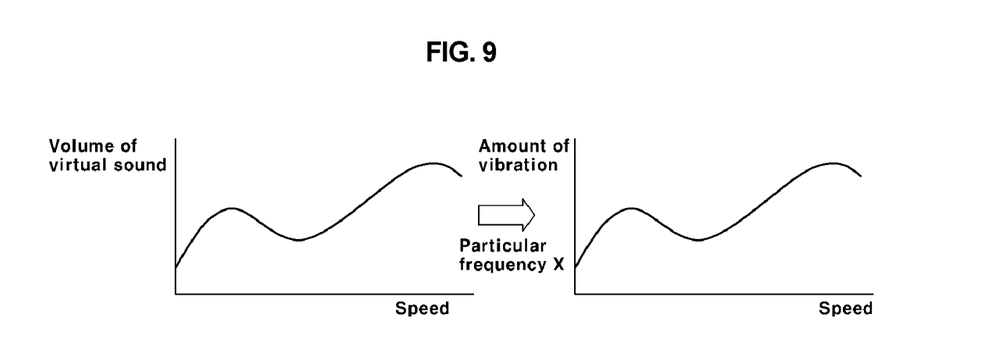

FIGS. 8 and 9 are diagrams showing examples of controlling the virtual vibration and the virtual sound according to an embodiment of the present disclosure. FIG. 8 shows an example of a pattern of the virtual vibration in constant-speed driving, and FIG. 9 shows an example of a pattern of the virtual vibration determined in conjunction with the virtual sound in acceleration driving.

In the examples of FIGS. 8 and 9, the speed refers to the above-described powertrain speed that may be the actual variable of the electric vehicle, such as the motor speed, the driving wheel speed, or the drive shaft speed, or is the actual vehicle speed. Alternatively, the speed may be the virtual engine speed or the virtual vehicle speed that are the virtual variables of the electric vehicle. Further, in FIG. 8, the speed and the accelerator pedal input value (APS value) may be replaced with a motor torque command.

In the present disclosure, the characteristics of the virtual effect are characteristics of the vibration to be produced through the vibration actuators and characteristics of the virtual sound to be produced through the sound device. The characteristics may include the amount of vibration and the volume of the virtual sound determined according to the vehicle driving information (actual variable or virtual variable). In particular, the characteristics of the virtual effect may include the amount of vibration and the volume of the virtual sound according to the accelerator pedal input value, the powertrain speed, or the motor torque command that are the vehicle driving information.

Herein, the amount of vibration may be replaced with the amplitude, and the characteristics of the virtual effect for producing the virtual vibration may include the amplitude and the period of the vibration, and the frequency band. In addition, the volume of the virtual sound means the strength of the sound, and the characteristics of the virtual effect for producing the virtual sound may include the strength and the time interval (the time interval of the sound) of the virtual sound, and the frequency band or the pitch (high or low of the sound).

For example, the characteristics of the virtual effect may include at least one or two among the amount of vibration, the amplitude, the period, and the frequency band of the vibration to be produced through the vibration actuators for providing the virtual vibration, and may include the strength and the time interval, and the frequency band or the pitch (high or low of the sound) of the virtual sound to be produced through the sound device for providing the virtual sound.

As shown in FIG. 8, the amount of vibration may be determined to a value linearly proportional to the accelerator pedal input value and the powertrain speed. That is, the greater the accelerator pedal input value and the powertrain speed, the greater the amount of vibration. Further, when the amount of vibration is determined using the real-time actual variable information or the virtual variable information, the controller generates and outputs the virtual effect producing signal for producing vibration matched to the determined amount of vibration so that operation of the vibration actuators is controlled according to the virtual effect producing signal.

In addition, as shown in FIG. 5, when the volume that is the characteristic of the virtual sound according to the speed is determined, the amount of vibration that is the characteristic of the virtual vibration is determined in the same pattern according to the speed, whereby the virtual vibration in conjunction with the virtual sound is produced. Through this, the virtual sound and the virtual vibration may be produced simultaneously.

As described above, in the present disclosure, the controller may determine the characteristics of the virtual vibration from the characteristics of the virtual sound among the characteristics of the virtual effect, and then generate the virtual effect producing signal according to the determined characteristics of the virtual vibration. For example, as shown in FIG. 5, the volume of the virtual sound may be converted into the amount of virtual vibration.

Alternatively, when the virtual sound is output through the speaker in the interior of the electric vehicle, the virtual sound in the interior of the electric vehicle is sensed through a sensor. Next, the controller processes a signal of the sensed virtual sound to convert the signal into a signal of vibration, and using the resulting signal of vibration as the virtual effect producing signal for producing vibration, the controller enables the vibration actuators to produce the virtual vibration.

Herein, the sensor may be a microphone capable of inputting and sensing sound. Further, the producing of the virtual vibration through the vibration actuators by using a signal (as the virtual effect producing signal) of the virtual vibration generated by converting the signal of the sensed virtual sound may be performed in the same manner as the producing of the virtual vibration through the vibration actuators by using the virtual effect producing signal, as described above.

Figure 10:
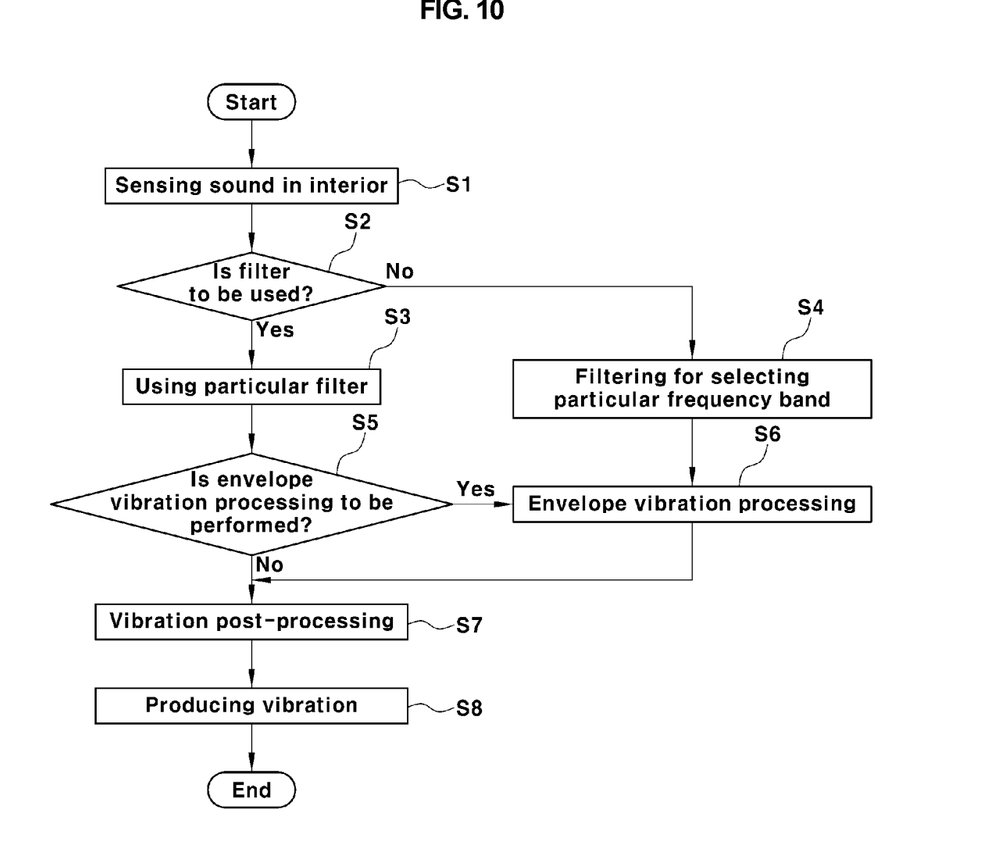
FIG. 10 is a flowchart showing a process of producing virtual vibration by processing a signal of sensed virtual sound in a method of generating a virtual effect according to an embodiment of the present disclosure.

FIG. 10 is a flowchart showing a process of producing virtual vibration based on virtual sound by converting a signal of virtual sound sensed during acceleration driving into a signal of virtual vibration in a method of generating a virtual effect according to an embodiment of the present disclosure. In order to convert the signal of the virtual sound sensed in the interior of the electric vehicle so as to perform processing for virtual vibration, the controller may use the volume of the virtual sound of information on the characteristics of the virtual sound.

That is, the signal of the virtual sound may be a signal including information on the volume of the virtual sound that is output through the sound device according to the vehicle driving information. Herein, the controller may convert the signal of the virtual sound indicating the volume of the virtual sound sensed through the sensor, into the signal of the virtual vibration.

The control process of FIG. 10 is continuously performed while the virtual sound is output in the interior of the electric vehicle during driving. First, the virtual sound in the interior of the electric vehicle is sensed through the sensor at step S1, and the controller processes a signal of the virtual sound including information on the volume of the sensed virtual sound. Herein, sound signals of left and right channels resulting from sensing of the virtual sound after output from the sound device may be synthesized and the synthesized sound signals may be used. This is to prevent signal loss due to stereo effect.

For example, if sound having the effect of putting low tones on the left channel and the high tones on the right channel is output through the speaker in the interior of the electric vehicle, when the right channel is used, low-tone vibration is generated because a signal for the low tones is unable to be sensed. To prevent this, the sound signals of the left and the right channel are synthesized for use.

When the virtual sound is sensed in the interior of the electric vehicle, the sensed virtual sound is filtered so that a signal of the virtual sound in a frequency band corresponding to low or high tones is selected at steps S2 and S3. For example, a low-tone part may be selected using a low-tone filter or a high-tone part may be selected using a high-tone filter.

Alternatively, other than low or high tones as described above, a particular frequency band may be selected. That is, a filter capable of passing a determined frequency band of the virtual sound is used so that the determined frequency band is selected and processed at step S4.

In addition, when the vibration actuators produce vibration based on a signal corresponding to sound other that low tones, the result is heard as sound rather than felt as vibration. To prevent this, envelope processing may be performed on the signal of the virtual sound at steps S5 and S6. The envelope processing is logic that generates a frequency equal to the size of an input waveform, and may generate a low-tone frequency regardless of a high-frequency waveform. For example, when a signal in a particular high-frequency region is filtered and subjected to envelope processing, vibration that substantially matches the sound is produced.

Herein, envelope processing may be performed on a signal in which a low-tone part is selected using a low-tone filter, and when using envelope processing, vibration that substantially matches the sound is realized. Last, vibration post-processing is performed using the filtered and envelope-processed signal at step S7, and by using the final signal, the vibration actuators are made to produce vibration at step S8. As for the process of envelope processing of a sound signal, the method, etc. is well known technology to those skilled in the art, and thus a detailed description thereof will be omitted.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An apparatus for generating a virtual effect of an electric vehicle, the apparatus comprising:
   a driving information detector configured to detect vehicle driving information in the electric vehicle;
   a controller configured to determine a characteristic of the virtual effect based on the vehicle driving information detected by the driving information detector, and configured to generate a virtual effect producing signal for producing the determined characteristic of the virtual effect; and
   a vibration actuator provided in a seat of the electric vehicle such that when the vibration actuator operates, a driver or a passenger who is in the seat experiences vibration, the vibration actuator being controlled by the virtual effect producing signal generated by the controller, so as to produce the vibration according to the determined characteristic of the virtual effect, the vibration actuator comprises:
a casing having an inner space therein,
a coil placed inside the casing and configured to receive a driving current, the coil together with the casing constituting a high-frequency exciter;
a yoke placed inside the casing,
a first magnet placed to be in contact with the yoke, the first magnet together with the yoke constituting a low-frequency exciter;
a second magnet placed to be in contact with the coil; and
a pole piece intervening between the first magnet and the second magnet, and configured to make magnetic flux generated from the first magnet and the second magnet flow into a magnetic gap.

2. The apparatus of claim 1, wherein the driving information detector includes at least one of: an accelerator pedal detector configured to detect a driver accelerator pedal input value, a speed detector configured to detect a vehicle powertrain speed, or a vehicle speed detector configured to detect a vehicle speed, and
the controller determines the characteristic of the virtual effect from at least one of the driver accelerator pedal input value, the vehicle powertrain speed, or the vehicle speed.

3. The apparatus of claim 2, wherein the vehicle powertrain speed is at least one of: a rotational speed of a vehicle driving motor, a rotational speed of a driving wheel, or a rotational speed of a drive shaft.

4. The apparatus of claim 1, wherein the controller determines the characteristic of the virtual effect from a torque command of a vehicle driving motor acquired by the detected vehicle driving information.

5. The apparatus of claim 1, wherein the characteristic of the virtual effect includes at least one of: an amount, an amplitude, a period, or a frequency band of the vibration to be produced by the vibration actuator.

6. The apparatus of claim 1, wherein a plurality of the vibration actuators are placed in foam pads of a seat base and a backrest of the seat.

7. The apparatus of claim 1, further comprising:
a sound device configured to produce and output virtual sound in the electric vehicle, and controlled by the virtual effect producing signal generated by the controller, so as to produce the virtual sound according to the determined characteristic of the virtual effect.

8. The apparatus of claim 7, wherein the virtual sound is virtual post-combustion sound simulating post-combustion sound coming from an exhaust system of an internal combustion engine vehicle, virtual engine sound simulating engine sound coming from an engine of the internal combustion engine vehicle, or virtual motor sound that is imagined coming from a vehicle driving motor.

9. The apparatus of claim 7, wherein the characteristic of the virtual effect for producing the virtual sound includes a starting point in time at which the virtual sound is output through the sound device, and further includes at least one of: a strength, duration, a time interval of the virtual sound, or a frequency band or a pitch that is how high or low a sound is.

10. The apparatus of claim 1, wherein the casing includes a first casing and a second casing that are assembled to each other to form the inner space, and the coil is placed at an inner side of the first casing so that the first casing and the coil constitute the high-frequency exciter.

11. The apparatus of claim 10, wherein the vibration actuator further comprises a suspension member placed between the casing and the yoke.

* * * * *